(12) United States Patent
Hill

(10) Patent No.: US 7,174,472 B2
(45) Date of Patent: Feb. 6, 2007

(54) LOW OVERHEAD INTEGRATED CIRCUIT POWER DOWN AND RESTART

(75) Inventor: Stephen John Hill, Austin, TX (US)

(73) Assignee: Arm Limited, Cambridge (GB)

( * ) Notice: Subject to any disclaimer, the term of this patent is extended or adjusted under 35 U.S.C. 154(b) by 188 days.

(21) Appl. No.: 10/441,267

(22) Filed: May 20, 2003

(65) Prior Publication Data

US 2004/0236968 A1 Nov. 25, 2004

(51) Int. Cl.
*G06F 13/14* (2006.01)

(52) U.S. Cl. .................. 713/323; 713/300; 713/310; 713/320; 713/321; 713/324; 713/330; 713/340

(58) Field of Classification Search ............ 713/320, 713/322, 323, 324
See application file for complete search history.

(56) References Cited

U.S. PATENT DOCUMENTS

| 4,907,150 | A | | 3/1990 | Arroyo et al. | |
|---|---|---|---|---|---|
| 5,537,656 | A | * | 7/1996 | Mozdzen et al. | 713/323 |
| 5,671,422 | A | * | 9/1997 | Datta | 710/261 |
| 6,055,640 | A | * | 4/2000 | Kageshima et al. | 713/320 |
| 6,775,787 | B2 | * | 8/2004 | Greene | 713/340 |
| 6,785,826 | B1 | * | 8/2004 | Durham et al. | 713/300 |
| 2002/0087774 | A1 | * | 7/2002 | Poisner et al. | 710/260 |
| 2002/0112193 | A1 | * | 8/2002 | Altman et al. | 713/323 |
| 2003/0131274 | A1 | * | 7/2003 | Mizuyabu et al. | 713/324 |
| 2004/0199747 | A1 | * | 10/2004 | Shelor | 712/209 |

* cited by examiner

*Primary Examiner*—A. Elamin
(74) *Attorney, Agent, or Firm*—Nixon & Vanderhye P.C.

(57) ABSTRACT

An integrated circuit provided with a power down and power up mechanism which operates by storing state data including at least architectural state data within storage cells having their own power supply with the main power supply being removed during the power down mode. Prior to removing the main power supply execution of data processing instructions within the instruction pipeline preceding a restart instruction are completed so as to reduce the amount of state data which needs to be stored across the power down event. Thus, a compromise is achieved between rapid power down through the use of dedicated storage cells and the circuit area requirements of such storage cells and the need to complete execution of some partially executed data processor instructions within the instruction pipeline and other operations such as, pending writes within the integrated circuit. The trigger event to trigger power down or power up may be a signal on an external pin, an internally generated signal within the integrated circuit execution of a specific data processing instruction, or other events.

16 Claims, 4 Drawing Sheets

LOW OVERHEAD INTEGRATED CIRCUIT POWER DOWN AND RESTART

BACKGROUND OF THE INVENTION

1. Field of the Invention

This invention relates to the field of integrated circuits. More particularly, this invention relates to techniques for powering down and restarting data processing instruction execution upon an integrated circuit for power saving or other reasons.

2. Description of the Prior Art

It is known to provide mechanisms for switching an integrated circuit between an operational state in which data processing instructions are being executed and a power down state in which such execution is suspended but state is preserved, such that execution can recommence without any loss of information. Previous approaches include:

1) Using a software routine to store the state that must be preserved out over the system bus to memory that will not be powered down or that retain its state when powered down. On power up, another software routine is used to read the state over the system bus, restore the apporptiate registers and resume execution.
2) Using scan chains that are often included in the design for test purposes to serially scan out the state of every flip-flip in the design and store it in memory that will not be powered down or will retain it's state when powered down.
3) Using non-volatile flip-flips or flip-flops that have an independent power supply so that they retain state during power down. Usually, only a small part of each flip-flop remains powered up holding the sate, and other transistors associated with normal operation are powered down. The small part that remains powered is often referred to as "balloon" circuit.

There are disadvantages with the above approaches: 1. Requires power down routines to be included in operating software. Existing code has to be retrofitted with these routines before power down can be used. It can also take a considerable amount of time to save and restore state as a software routine must be run in each case. This reduces the window of opportunity for taking advantage of idle time to power down. Although not requiring software support to function, 2 is slow as it requires serially scanning our the state of every flip-flop in design over one or ore scan chain before power down. Then scanning back in of all the state before power up. Again this reduces the window of opportunity for taking advantage of idle time to power down. 3. Does not require software support, and it allows very fast power up. These probably take only one or two cycles. However, adding balloon circuits to every flip-flop in the design adds a considerable area and possibly also a performance overhead.

SUMMARY OF THE INVENTION

Viewed from one aspect the present invention provides a method of switching an integrated circuit from an operational state in which data processing instructions are executed using an instruction pipeline to a power saving state in which execution of said data processing instructions is suspended, said method comprising the steps of:

receiving a power down trigger event to trigger a switch from said operational state to said power saving state;

completing at least some partially executed data processing instructions pending within said instruction pipeline and preceding within said pipeline an instruction at a restart point; and storing within storage cells of said integrated circuit state data defining a processing state of said integrated circuit which can be restored to said integrated circuit and execution of data processing instructions restarting from said instruction at said restart point; wherein upon switching from said operational state to said power saving state a main power supply operable to supply electrical power to said integrated circuit is disabled whilst a storage cell power supply operable to supply electrical power to said storage cells is maintained such that power consumption of said integrated circuit is reduced.

The invention recognizes that a significant reduction in the hardware requirement of the balloon circuit approach may be achieved whilst preserving a relatively rapid power down and power speed by using an approach whereby the integrated circuit is operated for a few cycles following the power down trigger to place it in to a relatively "clean" state whereby the number of cells whose state must be preserved to allow operation to be restarted is considerably reduced. Thereby relatively few cells must contain balloon circuits. In particular, at lease some of the partially executed data processing instructions within the pipeline are completed prior to the power down. Thus, the state associated with such partially executed instructions need not be saved. This state associated with partially executed instructions can be considerable and thus the present technique yields a significant saving in the number of storage cells required to save the state of the integrated circuit. The data processing instructions completed prior to the power down precede a restart instruction which is an instruction in the normal processing flow that is a point from which processing can be restarted cleanly using the state data which is stored.

Upon receiving a power down indicator the core spends a few cycles putting itself in a state where it is known that only the values stored in a specific subset of the flip-flops throughout the design must be preserved to enable operation to restart. The state of these flip-flops is preserved using balloon-circuits or similar techniques. Upon powerup the core puts itself in a state where operation can restart with pre-powerdown values preserved in only a specific subset of flip-flops throughout the design. Values in all other flip-flops will be reset, set or left uninitialized as appropriate. This offers a good compromise between speed of power-up-down (a few cycles) and area cost (only the values held in a subset of flops must be preserved) and can be realized without software support, although it doesn't have to be.

It will be appreciated that the trigger event for power down could take a variety of different forms, but preferably will be either an input signal received at an input pin or execution of a power saving mode entry program instruction inserted within the date processing instruction program flow. Both of these approaches have their own circumstances when they are useful and may be used in combination in some circumstances.

It will be appreciated that the state data to be preserved can be relatively wide ranging. It will be familiar to those in this technical field that an integrated circuit executing data processing instructions typically has a set of architectural states which an expression of the programmer's model and can be considered to provide a deterministic state of the system from a programmer's point of view between which states the execution of program instructions will be move the integrated circuit. In preferred embodiments of the invention the state date which is stored on power down includes parameters defining an architectural processing state of the integrated circuit. More dynamic transient types of state such as, for example, cache memory content and the like may be discarded on power down as the program can be restarted and ultimately settled back into a state as if it had not been powered down without the need to maintain this data.

Further examples of state date which it may be desired to preserve across a power down and power up event are one or more of program register bank data, configuration register data, processing status registered data and translation lookaside buffer data. Preserving this data is a good way of expressing the integrated circuit state and so permitting restart without any loss of state, but at the same time not unduly burdening the system with the need to store and retrieve data which can in any case be rebuilt, such as cache contents and the like.

With respect to cache data solutions to preserving this state includes:

1. Leave the cache powered up, and preferably build in a low-power state where it retains state data but uses little power;
2. Re-build the cache information after restarting;
3. Store some performance critical subset of the cache but not all of it (e.g. only lock down areas).

It will be appreciated that the storage cells used to store in hardware the selected state data can take a variety of different forms, but are in preferred embodiments balloon circuits powered by their own power supply and associated with the latches for storing the data in normal operation which are themselves powered by the main power supply.

Viewed from another aspect the present invention provides a method of switching an integrated circuit from a power saving state in which execution of said data processing instructions using an instruction pipeline is suspended to an operational state in which data processing instructions are executed using said instruction pipeline, said method comprising the steps of:

receiving a power up trigger event to trigger a switch from said power down state to said operational state;

restoring from within storage cells of said integrated circuit state data defining a processing state of said integrated circuit immediately prior to execution of an instruction at a restart point with said instruction pipeline drained of preceding data processing instructions; and restarting execution of data processing instructions from said instruction at said restart point;

wherein in said power down state a storage cell power supply operable to supply electrical power to said storage cells is maintained whilst a main power supply operable to supply electrical power to said integrated circuit is disabled such that power consumption of said integrated circuit is reduced and upon switching from said power down state to said operational state said main power supply is enabled.

Viewed from a further aspect the present invention provides an integrated circuit having an operational state in which data processing instructions are executed using an instruction pipeline and a power saving state in which execution of said data processing instructions is suspended, said integrated circuit comprising:

a power down trigger receiver operable to receive a power down trigger event to trigger a switch from said operational state to said power saving state;

pipeline draining logic operable to control completion of at least some partially executed data processing instructions pending within said instruction pipeline and preceding within said pipeline an instruction at a restart point;

storage cells operable to store state data defining a processing state of said integrated circuit which can be restored to said integrated circuit and execution of data processing instructions restarting from said instruction at said restart point;

a main power supply operable to supply electrical power to said integrated circuit; and a storage cell power supply operable to supply electrical power to said storage cells; wherein upon switching from said operational state to said power saving state said main power supply is disabled whilst said storage cell power supply is maintained such that power consumption of said integrated circuit is reduced.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
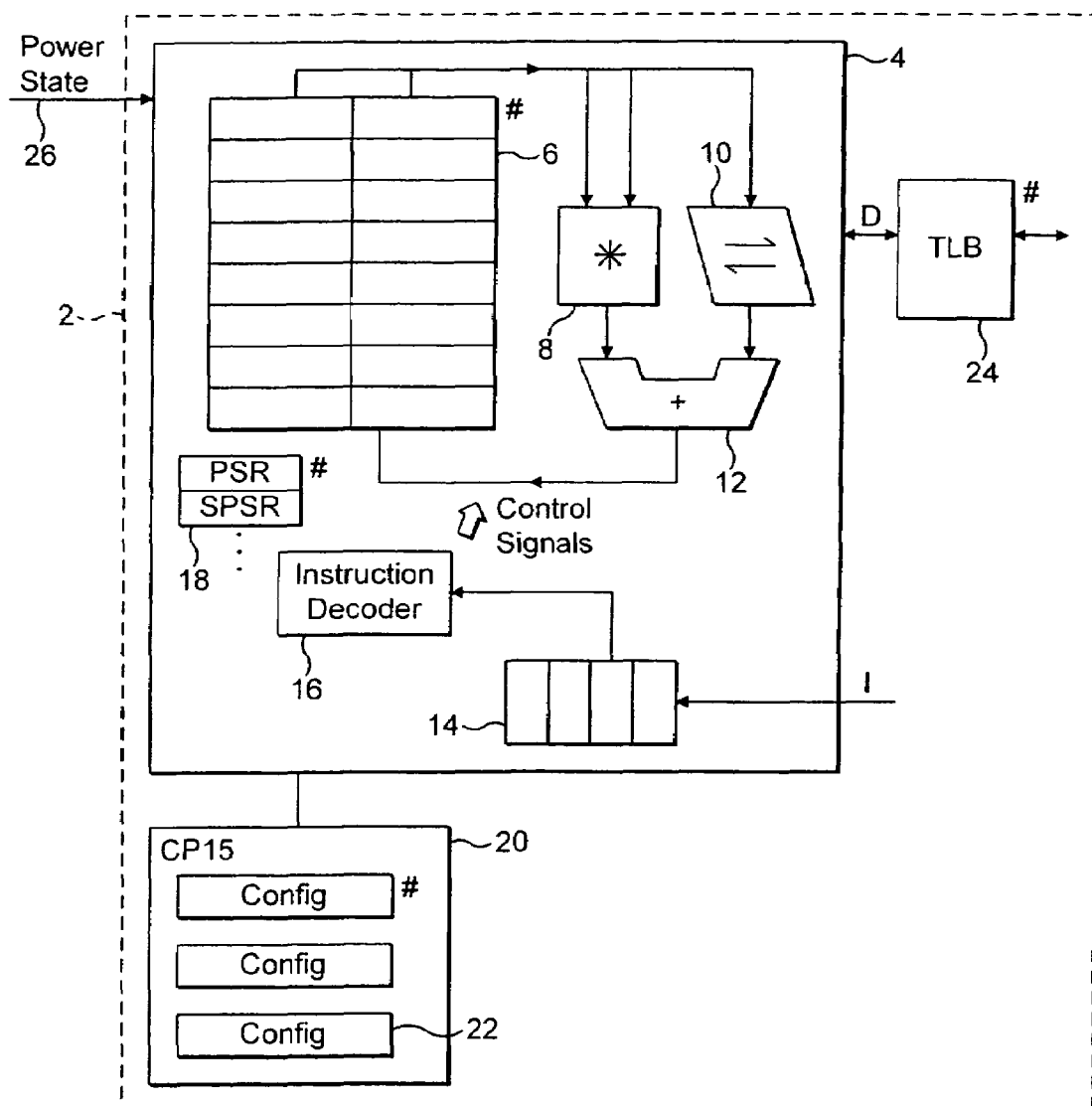
FIG. 1 schematically illustrates an integrated circuit operable to execute data processing instructions and which may be subject to power down and restart operations.

FIG. 1 schematically illustrates an integrated circuit 2 including a processor core 4 operable to execute data processing instructions received in an instruction stream I to perform data manipulations upon data values received in a data stream D. The processor core 4 includes circuit elements including a program register bank 6, a multiplier 8, a shifter 10, an adder 12, an instruction pipeline 14, an instruction decoder 16 and processor status registers 18. It will be appreciated that the processor core 4 will typically include many other circuit elements, but these have been omitted from FIG. 1 for the sake of clarity. Also illustrated in FIG. 1 is a coprocessor 20 coupled to the processor core 4 and storing configuration data in configuration registers 22. A translation lookaside buffer 24 is also associated with the processor core 4 on its data path and serves to store translation lookaside data, such as maybe associated with a tightly coupled memory or the like. The integrated circuit 2 may typically be a system-on-chip type design which will include many other circuit elements which may be subject to power down or power up or may be permanently powered or have their power managed in some other way.

Illustrated in FIG. 1 is an external power state signal 26 input to the processor core 4. This power state signal may be received from an external input (pin) to the integrated circuit 2 or maybe generated within the integrated circuit 2 itself. The signal on the power state input 26 can be considered to be a trigger event serving to trigger power down when the system is currently powered up and trigger power up when the system is currently powered down.

In normal operation the processor core 4 receives a stream of data processing instructions within the instruction pipeline 14 which progress along the pipeline stages, such a fetch, decode, read, execute, writeback etc. Pipelined data processing in this way is a well known technique in this technical field and will not be described further herein. The data processing instructions within the instruction pipeline 14 are supplied to a instruction decoder 16 and generate control signals to the other elements within the processor core 4 to configure and drive the operation of the other circuit elements within the processor core 4 in accordance with the data processing instructions being decoded. It will be appreciated that in such a pipelined the total execution of a data processing instruction is spread across man processing cycles and across many pipeline stages. Partially executed data processing instructions can have a considerable amount of state data associated with them representing their current partially executed form which is in normal operation preserved and passed along the instruction pipeline 14 until the data processing instruction is fully completed. Storing all of this state data as well as all of the other state data within the processer core 4 within balloon circuits for an instant power down type of operation represents a significant overhead and complication. In practice, the present technique serves to effectively stop execution of a restart instruction whilst allowing preceding instructions to complete and drain from the instruction pipeline 14. This avoids the need to have to store state data associated with any partially completed data processing instructions preceding the restart instruction. Once it is desired to power up the system again the restart instruction can be reloaded into the instruction pipeline 14 as if it had not previously been executed and processing continue.

Illustrated in FIG. 1 are various circuit elements marked with an "#" symbol indicating that these elements store state data which should be preserved in storage cells (balloon circuits) across a power down and power up cycle. More particularly, in this example the circuit elements are the program register bank 6, the processing status registers 18, the configuration registers 22 and the translation look a side buffer 24. It will be appreciated that this is only one example of the state data which may be preserved. In other embodiments additional or alternative state data may be preserved depending upon the particular circumstances.

Figure 2:
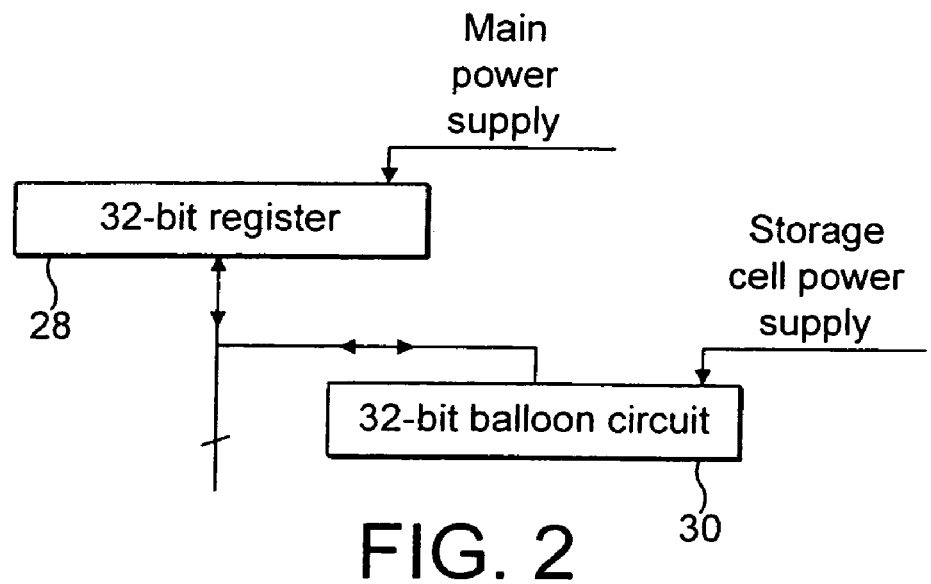
FIG. 2 schematically illustrates a register formed of latches with associated balloon circuits storing state data during a power down mode of operation.

FIG. 2 schematically illustrates a 32-bit register 28 which can be considered to be formed of 32 latches. This 32-bit register 28 is supplied by a main power supply during normal operation. When it desired to power down the system, the main power supply is removed and so the latches within the register 28, which normally hold the state data, will lose this state data unless it is otherwise saved. For this purpose, 32 balloon circuits 30 are coupled to the register 28 and serve to store the state data therefrom during power down. The balloon circuits 30 are supplied with their own storage cell power supply, which is maintained during a power down event. This storage cell power supply may have quite different characteristics to the main power supply in an effort to reduce power consumption. In practice the balloon circuits 30 may be included within respective flops and so the circuit may be formed as 32×(flop-with-balloon) rather than (32×flop)+(32×balloon) as schematically illustrated.

Figure 3:
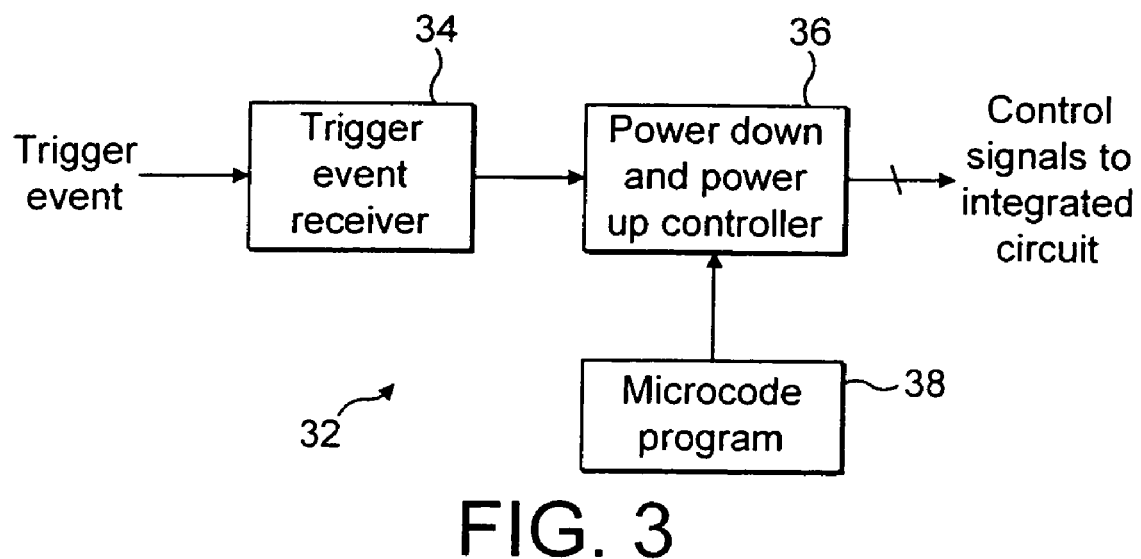
FIG. 3 schematically illustrates control logic for controlling power down and restart operations.

FIG. 3 illustrates a controller 32 for controlling power down and 30 power up operation. A trigger event is received at a trigger event receiver 34. This trigger event may be a signal on an external input pin, a signal on an internal signal line generated by another component on the integrated circuit 2, a signal generated by the instruction decoder 16 representing execution on a specific software instruction representing a trigger event or some other type of trigger event. When the trigger event receiver 34 has noted a trigger event, it simulates a power down and power up controller 36 to generate a sequence of control signals which are supplied to circuit elements within the integrated circuit 2 and the processor core 4 in particular to carry out either power down or power tip depending upon what is the current state of the system. The sequence of events to be performed depending upon the transition to be made can be relatively lengthy and accordingly a microcode program 38 maybe used to control the power down and power up controller 36. As an example of the control signals to the integrated circuit and their desired operations, these include the draining of the instruction pipeline 14 whilst maintaining the program counter value PC within the program register bank 6 indicating a restart instruction program address for reloading of that instruction upon restart, storage within balloon circuits of the previously mentioned state data from the program register bank 6, the processing status registers 18, the configuration registers 22 and the translation lookaside buffer 24, the draining of any write buffer associated with the processor core 4 and other actions as appropriate.

Upon restart, the control signals may be used to reload the state data into its normal location from the storage cells, and initiate fetching of the restart program instruction from the program instruction address preserved with the PC value that was saved.

Figure 4:
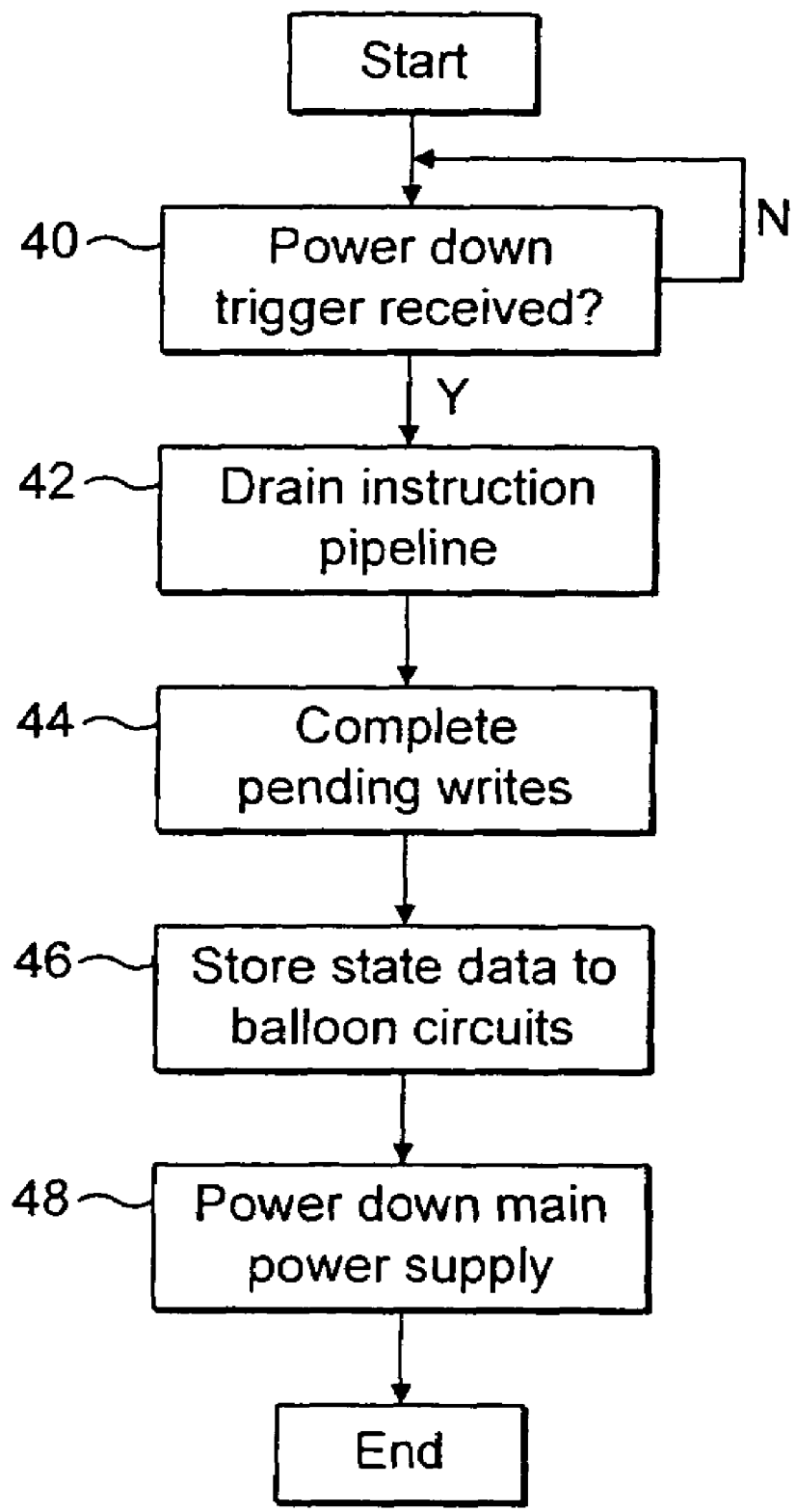
FIG. 4 is a flow diagram schematically illustrating the power down process.

FIG. 4 is a flow diagram schematically illustrating power down operation. At step 40 the system waits for a power down trigger event to be received. When this is received, processing at step 42 drains the instruction pipeline 14 of all pending instructions preceding the restart instruction. These drained instructions are completed such that no state associated with them needs to be stored across the power down event.

At step 44 any pending writes, such as writes within a write buffer are completed such that these do not need to be stored. At step 46 the state data which has been selected to be stored across the power down event, i.e. including at least the architectural data forming a processor state as seen from a programmer's model point of view, as well as optionally other additional data which might be desirable to speed up restart, is stored within balloon circuits associated with the circuits which normally store that state data.

At step 48 the main power supply is then switched off so as to enter the power down mode.

Figure 5:
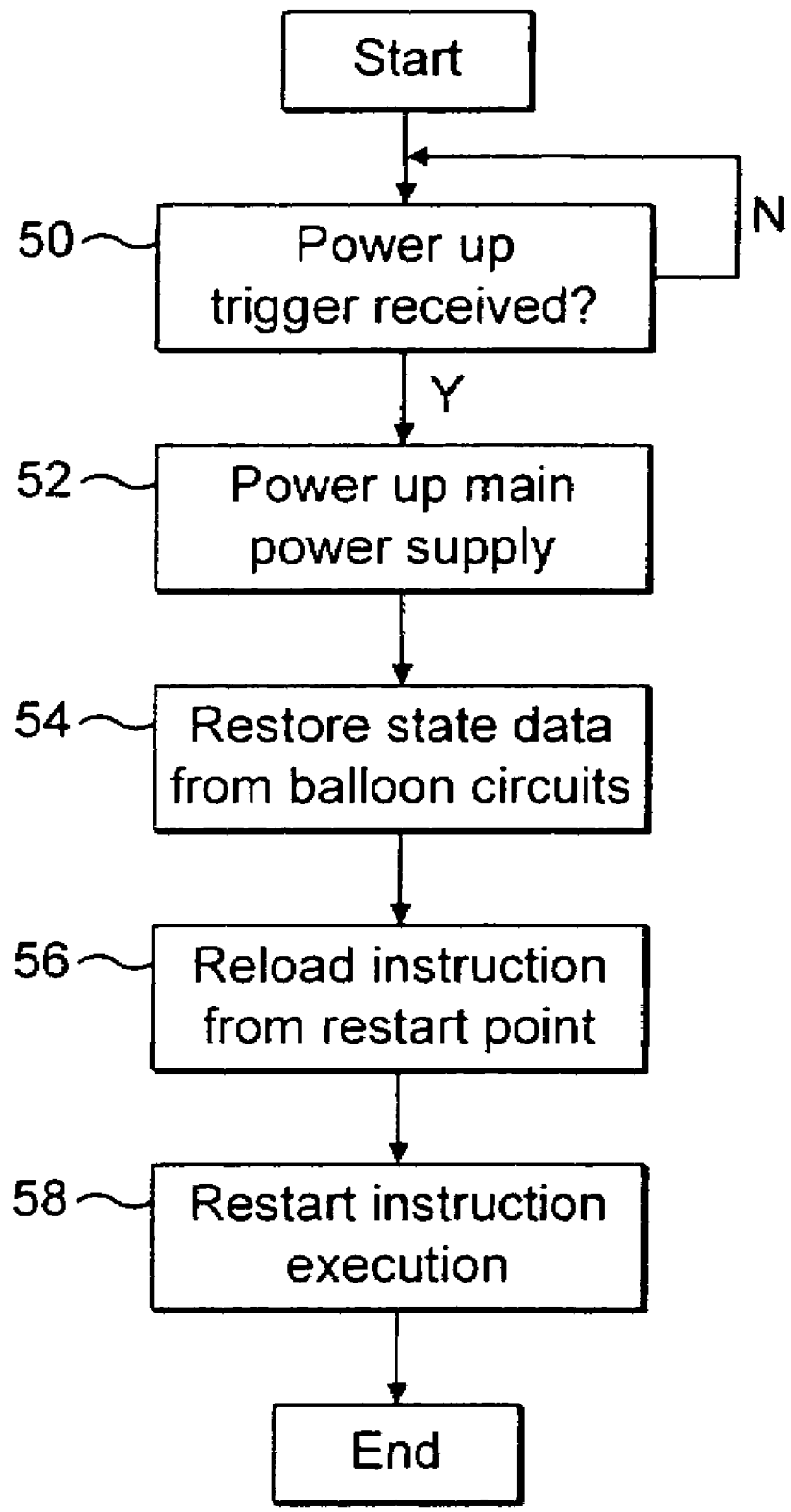
FIG. 5 is a flow diagram schematically illustrating the power up process.

FIG. 5 is a flow diagram schematically illustrating power up operation. At step 50 the system waits for a power up trigger to be received. At step 52 the main power supply is restored. At step 54 the state data stored with the balloon circuits restored to its normal storage locations within the integrated circuit 2. At step 56 the instruction pointed to by the program counter register value PC as the restart point is reloaded into the instruction pipeline 14. At step 58 execution of this restart instruction is commenced.

Although illustrative embodiments of the invention have been described in detail herein with reference to the accompanying drawings. It is to be understood that he invention is not limited to those precise embodiments, and that various changes and modifications can be effected therein by one skilled in the art with departing from the scope or sprit of the invention as defined by the appended claims.

I claim:

1. A method of switching an integrated circuit from an operational state in which data processing instructions are executed using an instruction pipeline to a power saving state in which execution of said data processing instructions is suspended, said method comprising the steps of:

receiving a power down trigger event to trigger a switch from said operational state to said power saving state;

completing at least some partially executed data processing instructions pending within said instruction pipeline and preceding within said pipeline an instruction at a restart point; and storing state data within balloon circuits located with respective latches serving in said operational state to store said state data, said state data defining a processing state of said integrated circuit which can be restored to said integrated circuit with execution of data processing instructions restarting from said instruction at said restart point; wherein upon switching from said operational state to said power saving state a main power supply operable to supply electrical power to said integrated circuit including said latches is disabled whilst a storage cell power supply operable to supply electrical power to said balloon circuits is maintained such that power consumption of said integrated circuit is reduced.

2. A method as claimed in claim 1, wherein said power down trigger event is one of:

an input signal received at an input to said integrated circuit; and execution of a power saving mode entry program instruction by said integrated circuit.

3. A method as claimed in claim 1, wherein said state data includes parameters defining an architectural processing state of said integrated circuit.

4. A method as claimed in claim 1, wherein said state data includes one or more of:
   (i) program register bank data;
   (ii) configuration register data;
   (iii) processing status register data; and
   (iv) translation lookaside buffer data.

5. A computer program product including a computer program tangibly embodied in a computer-readable medium which when executed is operable to control an integrated circuit in accordance with a method as claimed in claim 1.

6. A computer program product as claimed in claim 5, wherein said computer program includes a power down instruction operable when executed by said integrated circuit to trigger a switch from said operational state to said power down state.

7. A method of switching an integrated circuit from a power saving state in which execution of said data processing instructions using an instruction pipeline is suspended to an operational state in which data processing instructions are executed using said instruction pipeline, said method comprising the steps of:

receiving a power up trigger event to trigger a switch from said power down state to said operational state;

restoring to latches from within balloon circuits located with respective ones of said latches state data defining a processing state of said integrated circuit immediately prior to execution of an instruction at a restart point with said instruction pipeline drained of preceding data processing instructions; and restarting execution of data processing instructions from said instruction at said restart point using said state data stored in said latches;

wherein in said power down state a storage cell power supply operable to supply electrical power to said balloon circuits is maintained whilst a main power supply operable to supply electrical power to said integrated circuit including said latches is disabled such that power consumption of said integrated circuit is reduced and upon switching from said power down state to said operational state said main power supply is enabled.

8. A method as claimed in claim 7, wherein said power up trigger event is an input signal received at an input to said integrated circuit.

9. A method as claimed in claim 7, wherein said state data includes parameters defining an architectural processing state of said integrated circuit.

10. A method as claimed in claim 7, wherein said state data includes one or more of:
    (i) program register bank data;
    (ii) configuration register data;
    (iii) processing status register data; and
    (iv) translation lookaside buffer data.

11. An integrated circuit having an operational state in which data processing instructions are executed using an instruction pipeline and a power saving state in which execution of said data processing instructions is suspended, said integrated circuit comprising:

a power down trigger receiver operable to receive a power down trigger event to trigger a switch from said operational state to said power saving state;

pipeline draining logic operable to control completion of at least some partially executed data processing instructions pending within said instruction pipeline and preceding within said pipeline an instruction at a restart point;

balloon circuits located with respective latches serving in said operational state to store state data, said state data defining a processing state of said integrated circuit which can be restored to said integrated circuit and execution of data processing instructions restarting from said instruction at said restart point;

a main power supply operable to supply electrical power to said integrated circuit including said latches; and a storage cell power supply operable to supply electrical power to said balloon circuits;

wherein upon switching from said operational state to said power saving state said main power supply is disabled whilst said storage cell power supply is maintained such that power consumption of said integrated circuit is reduced.

12. An integrated circuit as claimed in claim 11, comprising:

a power up trigger receiver operable to receive a power up trigger event to trigger a switch from said power down state to said operational state;

restoring logic operable to control restoring from within said balloon circuit said state data; and restart logic operable to control restarting of execution of data processing instructions from said instruction at said restart point;

wherein upon switching from said power down state to said operational state said main power supply is enabled.

13. An integrated circuit as claimed in claim 11, wherein said power down trigger event is one of:

an input signal received at an input to said integrated circuit; and execution of a power saving mode entry program instruction by said integrated circuit.

14. An integrated circuit as claimed in claim 12, wherein said power up trigger event is an input signal received at an input to said integrated circuit.

15. An integrated circuit as claimed in claim 11, wherein said state data includes parameters defining an architectural processing state of said integrated circuit.

16. An integrated circuit as claimed in claim 11, wherein said state data includes one or more of:
 (i) program register bank data;
 (ii) configuration register data;
 (iii) processing status register data; and
 (iv) translation lookaside buffer data.

* * * * *